US008826848B2

(12) United States Patent
Houben et al.

(10) Patent No.: US 8,826,848 B2
(45) Date of Patent: Sep. 9, 2014

(54) MULTI COMPONENT PARTICLE GENERATING SYSTEM

(75) Inventors: René Jos Houben, Nederweert (NL); Andries Rijfers, Kamerik (NL); Leonardus Antonius Maria Brouwers, Beesel (NL); Jacobus Eversdijk, Den Bosch (NL); Kjeld Jacobus Cornelis Van Bommel, Eindhoven (NL)

(73) Assignee: Nederlandse Organisatie voor Toegepast-Natuurwetenschappelijk Onderzoek TNO (NL)

( * ) Notice: Subject to any disclaimer, the term of this patent is extended or adjusted under 35 U.S.C. 154(b) by 1131 days.

(21) Appl. No.: 12/669,656

(22) PCT Filed: Jul. 7, 2008

(86) PCT No.: PCT/NL2008/050456
§ 371 (c)(1),
(2), (4) Date: Jun. 1, 2010

(87) PCT Pub. No.: WO2009/014432
PCT Pub. Date: Jan. 29, 2009

(65) Prior Publication Data
US 2010/0247760 A1   Sep. 30, 2010

(30) Foreign Application Priority Data

Jul. 20, 2007   (EP) .................................... 07112887

(51) Int. Cl.
| | |
|---|---|
| B05C 5/02 | (2006.01) |
| B05D 1/02 | (2006.01) |
| B05C 15/00 | (2006.01) |
| B05C 5/00 | (2006.01) |
| B01J 2/02 | (2006.01) |
| B01J 2/00 | (2006.01) |

(52) U.S. Cl.
CPC .. *B01J 2/02* (2013.01); *B01J 2/003* (2013.01); *B01J 2/00* (2013.01)
USPC ........................................... 118/303; 118/300

(58) Field of Classification Search
USPC .................................................... 118/DIG. 16
See application file for complete search history.

(56) References Cited

U.S. PATENT DOCUMENTS

| | | | | |
|---|---|---|---|---|
| 4,341,310 | A | * | 7/1982 | Sangiovanni et al. ........ 209/638 |
| 4,390,284 | A | | 6/1983 | Hyde et al. |
| 5,100,509 | A | * | 3/1992 | Pisecky et al. ................. 159/4.2 |
| 5,230,735 | A | * | 7/1993 | Murata et al. ................... 118/20 |

(Continued)

FOREIGN PATENT DOCUMENTS

| | | |
|---|---|---|
| EP | 0 563 402 A1 | 10/1993 |
| EP | 1 364 718 A1 | 11/2003 |

(Continued)

OTHER PUBLICATIONS

Taiwanese Office Action (with translation) for Taiwan Patent Application No. 097125514, dated Feb. 18, 2014, 13 pages.

*Primary Examiner* — Dah-Wei D Yuan
*Assistant Examiner* — Jethro Pence
(74) *Attorney, Agent, or Firm* — Dorsey & Whitney LLP

(57) ABSTRACT

The invention relates to a method of generating a 'multicomponent particle comprising: and a multicomponent particle generating system comprising: a first nozzle constructed to generate at least one isolated particle; a second nozzle arranged to generate a generally uninterrupted fluid jet without breaking up, —said first and second nozzles arranged to have said isolated particle collide with the fluid jet so as to combine said particle with fluid of the second fluid jet, for providing a multicomponent particle; and a collector by which said isolated particles can be captured after collision with the fluid jet.

10 Claims, 6 Drawing Sheets

(56) References Cited

U.S. PATENT DOCUMENTS

| | | |
|---|---|---|
| 5,447,567 A | 9/1995 | Tanaka et al. |
| 2007/0003694 A1 | 1/2007 | Chiruvolu et al. |

FOREIGN PATENT DOCUMENTS

| | | | |
|---|---|---|---|
| EP | 1364718 | 11/2003 | |
| GB | 2 067 908 A | 8/1981 | |
| JP | 62282658 | 12/1987 | |
| JP | 2282658 | 11/1990 | |
| TW | 200711809 | 5/1995 | |
| WO | WO 93/11844 | * 6/1993 | ............ B01D 1/18 |
| WO | WO 93/11844 A1 | 6/1993 | |
| WO | WO 94/17941 A1 | 8/1994 | |
| WO | WO 2006/038979 | 11/2006 | |

* cited by examiner

MULTI COMPONENT PARTICLE GENERATING SYSTEM

CROSS-REFERENCE TO RELATED APPLICATIONS

This application is the national stage application of PCT Patent Application No. PCT/NL2008/050456, filed Jul. 7, 2008 and entitled "Multi Component Particle Generating System", which claims priority under 35 U.S.C. §365(b) to European Patent Application No. 07112887.0 filed Jul. 20, 2007 and entitled "Multi Component Particle Generating System".

The invention relates to a multi component particle generating system.

In the art, producing multicomponent particles is complex when aiming to produce smaller particle volumes in larger quantities. EP1364718 discloses a concentric nozzle arrangement to produce a mixed or encapsulated particle. However, the tuning of relative viscosities and fluid pressures of the two components is complex and limits the application possibilities. Furthermore, U.S. Pat. No. 4,341,310 teaches an arrangement of two systems generating streams of droplets arranged at an angle, to selectively eject a droplet from one of the droplet streams by a droplet of the other of the droplet streams. This arrangement is aimed at generating precisely timed collisions by use of polarity adjustment of the fluid. It is difficult to produce large quantities of multicomponent particles in this manner.

U.S. Pat. No. 5,230,735 discusses a system for mixing powder particles with fluid material via a wetted inner wall. This system easily leads to clogging and coagulation of powder particles. Therefore, the provision of individually generated multicomponent particles is not possible. A similar mechanism is illustrated in U.S. Pat. No. 2,067,908.

Furthermore, EP0563402 discloses a granule coating apparatus wherein a powder nozzle is formed to have a central powder blowout opening and a concentrically arranged tapered coating liquid blowout path. This system is provided to form good intermixing with the powder and the liquid, however, due to the form of the blowout jet, selected isolated coating control of particles is not possible; thus easily leading to clogging.

In one aspect, the invention aims to provide a multicomponent particle generating system that mitigates the problems discussed above and that can provide for coating and/or intermixing of isolated particles. To this end, a continuous particle generating system is provided according to the features of claim 1. In particular, a multicomponent particle generating system is provided comprising first and second pressure systems comprising first and second nozzles respectively, for pressurizing first and second fluids respectively. The first nozzle is constructed to generate at least one isolated particle of first fluid; wherein said second nozzle is arranged to generate a generally uninterrupted fluid jet; said first and second nozzles arranged to have said isolated particle collide with the fluid jet so as to encapsulate said particle of first fluid by the second fluid.

In addition, the invention provides a method of generating a multicomponent particle comprising: generating at least one isolated particle of a first material; generating a generally uninterrupted fluid jet of a second material; and colliding said isolated particle with the fluid jet so as to combine said particle of first material with the second material.

By colliding the particles in the above described manner, a large volume of special purpose multicomponent particles can be created.

Other features and advantages will be apparent from the description; in conjunction with the annexed drawings, wherein.

Figure 1:
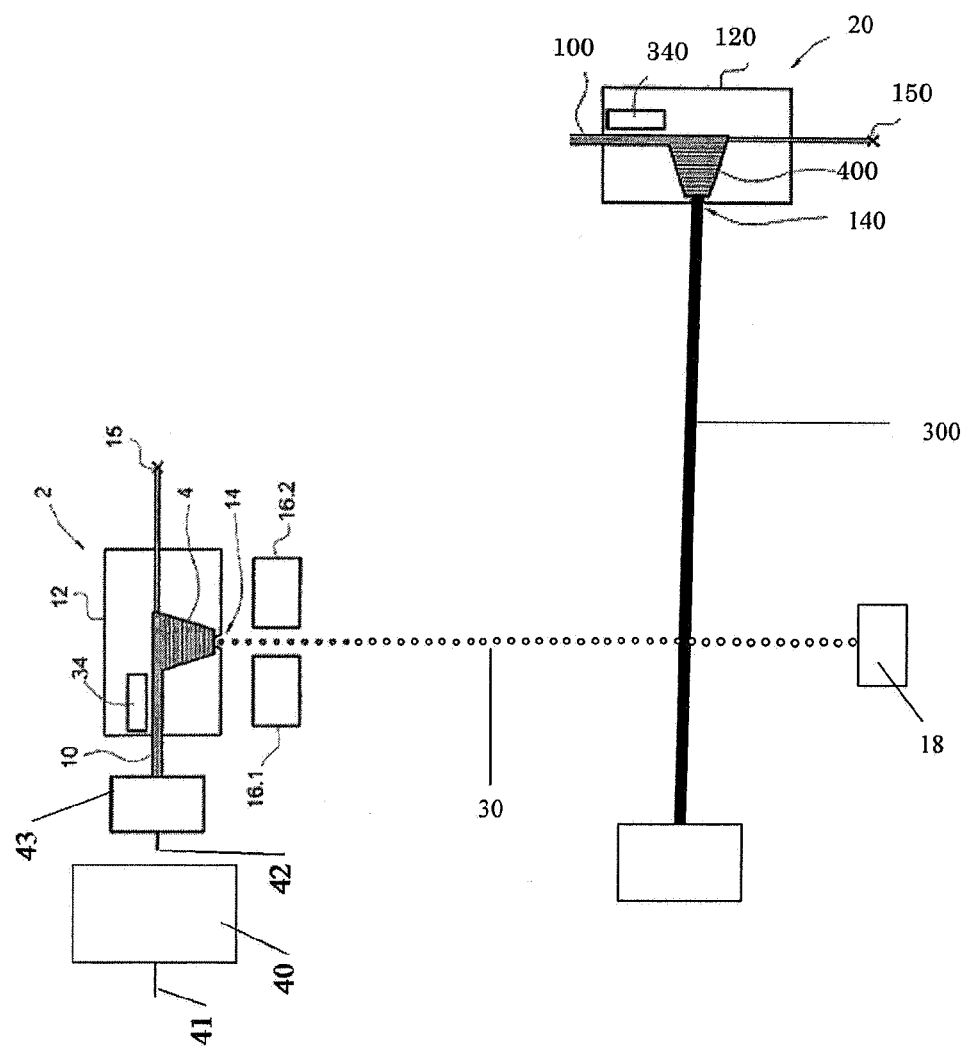
FIG. 1 shows schematically an embodiment of a printing system for use in the present invention.
Figure 6:
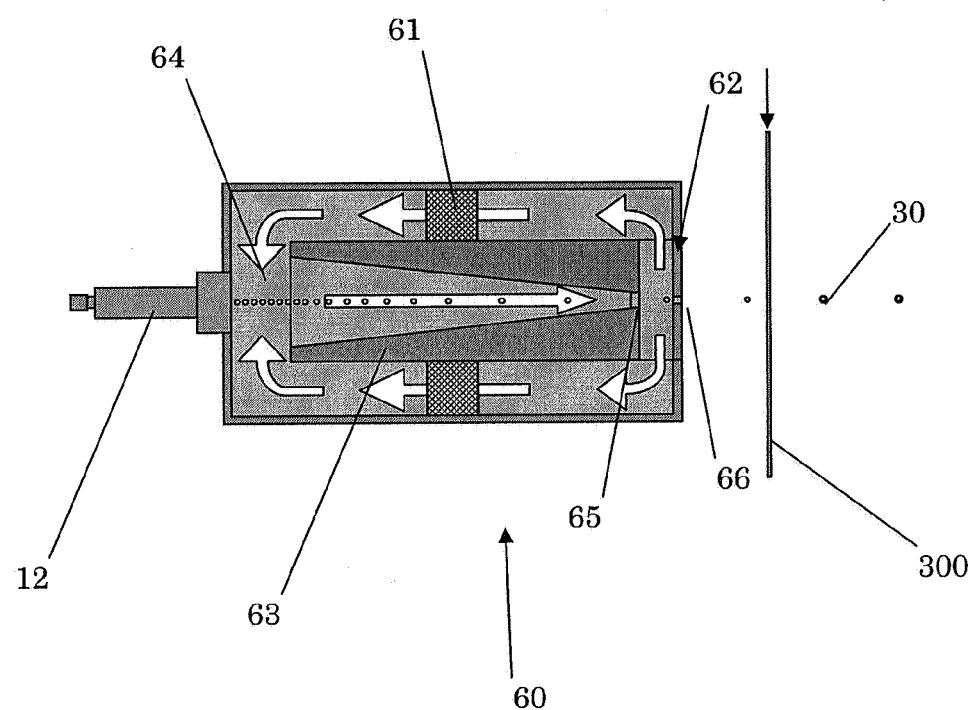

FIG. 6 shows an additional embodiment, demonstrating a method of accelerating a particle FIG. 1 shows schematically a droplet generating apparatus 2 for printing a fluid material 4. This droplet generating apparatus is an example of a particle generating system that is able to individually generated isolated particles in the form of droplets. The apparatus 2 comprises a droplet generating head 12, constructed and arranged for printing a fluid with a printing pressure in at least a part of a channel upstream of the printing head, preferably in an interval of 0.1-3000 bars. In addition, a pressure system 40 is provided comprising a fluid inlet 41 and an outlet channel 42.

The outlet channel 42 of the pressure system 40 connects with a damper 43. The outlet of the damper 43 is connected to the print head 12 via channel 10. The channel in the print head 12 is provided with at least one outflow opening, nozzle 14 through which the fluid material 4 exits under pressure in the form of a jet breaking up into drops, in order for these drops, after being selectively deflected, or directed, towards fluid jet 300. A transverse dimension of the nozzle 14 can be in the interval of 5-300 micron.

In this example, the channel 10 comprises a portion downstream of the nozzle 14 which is provided with a cock 15. By opening the cock 15, the printhead 12 can be flushed with a flushing material/flushing ink which is present in the channel.

The illustrated apparatus 2 is a printer of the continuous jet-type, whereby a continuous stream of drops to be printed is formed. However, the invention may be also applicable in a drop-on-demand type printer system where drops are delivered through the outflow opening only if the printhead has been activated to that effect. For the purpose of forming a jet breaking up into drops, the apparatus 2 is provided with a pressure regulating mechanism for varying the pressure of the material 4 upstream of the outflow opening.

The apparatus 2 in this example may be provided with a pre-treatment system 16.1, 16.2 enabling the drops to be pretreated. To that end, the pre-treatment system 16.1, 16.2 is provided, for instance, with a heater, cooler, a drying system, gas treatment, radiation treatment (UV treatment) by means of which the drops can be pretreated. Further, the apparatus 2 may be provided with a collector 18 by which particular drops can be captured. Clearly, the collector 18 is shown to be able to collect the isolated droplets after collision, typically, after having flown in a free flight sufficiently to be able to collect the particles substantially individually, for example, after a dry-out phase or a chemical reaction phase in free flight.

The pressure generating means 40 may be constructed for providing a printing pressure in an interval of 0.1-3000 bars. Accordingly, high-viscous materials 4, for instance in a range of 0.1-800 mPa·s may be passed under a predetermined pressure through the channel in the direction of the nozzle 14. Under this pressure, viscous fluid 4 accommodated in the reservoir is forced through the channel 10 to the nozzle 14 in the printhead 12. Next, the viscous fluid 4 is forced through the nozzle 14 to fly as droplets 30 in free flight towards the collector 18 arranged in a flight trajectory of the particle 30.

The apparatus 2 according to FIG. 1 is preferably provided with a heating element 34 for adjusting the viscous fluid 4 to a desired temperature. By adjusting the temperature of the viscous fluid 4, the viscosity of the fluid can (to some extent) be (additionally) regulated. The heating element may be included in the printhead 12 in or near the channel 10.

In addition, a second pressure system 20 is provided comprising a second nozzle 140. The second nozzle 140 is arranged to generate a generally uninterrupted fluid jet 300.

Preferably the second nozzle 140 is slitted to produce a sheet form or curtain form uninterrupted fluid jet having a relatively thin thickness of about several microns, preferably less than 1500 micron, to arrive at smaller thicknesses. Typically, the sheet form jet, at a particle traversing place has a thickness which is relatively thin so that the particles can traverse without being caught by the jet. The jets may have varying forms such as concentric forms flat shapes or curved shapes, but are essentially not disturbed near a particle traversing location, contrary to, for example, such as in EP0563402 by transverse directed flows of additional jets. A cross-section of the second nozzle 140 may be formed having broadened opposite sides. The second pressure system 20 is arranged to direct the fluid jet 300 at an angle relative to the direction of the beam of the isolated droplets 30 generated by the nozzle 14 of the fluid pressure system 2. Clearly, as follows from the described embodiments and related figures, in this context, the term "isolated" refers to the feature that particles are generated substantially separate from each other, and that, although having arbitrary incidence frequency, particles will be spatially separated when directed towards the jet. Although the invention can be practiced with other particle generating devices, for fluid particles, drop on demand or continuous droplet generating devices based on the Rayleigh break up mechanism are suitable since these devices can impart sufficient kinetic energy to the droplets to collide with a jet and maintain their individuality. Depending on the angle, the fluid nozzle 14 and second nozzle 140 are arranged to have the isolated droplets 30 collide with fluid jet 300 generated by the second nozzle, either in transmissive mode or in reflective mode. Accordingly, as will be further illustrated in the examples a combined droplet is formed of the first fluid (in any phase state) with the second fluid of the fluid jet 300 to provide a multicomponent droplet. Printhead 120 of pressure system 20 is depicted with heating element 340; inlet channel 100; cock 150 and fluid material 400, to produce fluid jet 300.

Figure 5:
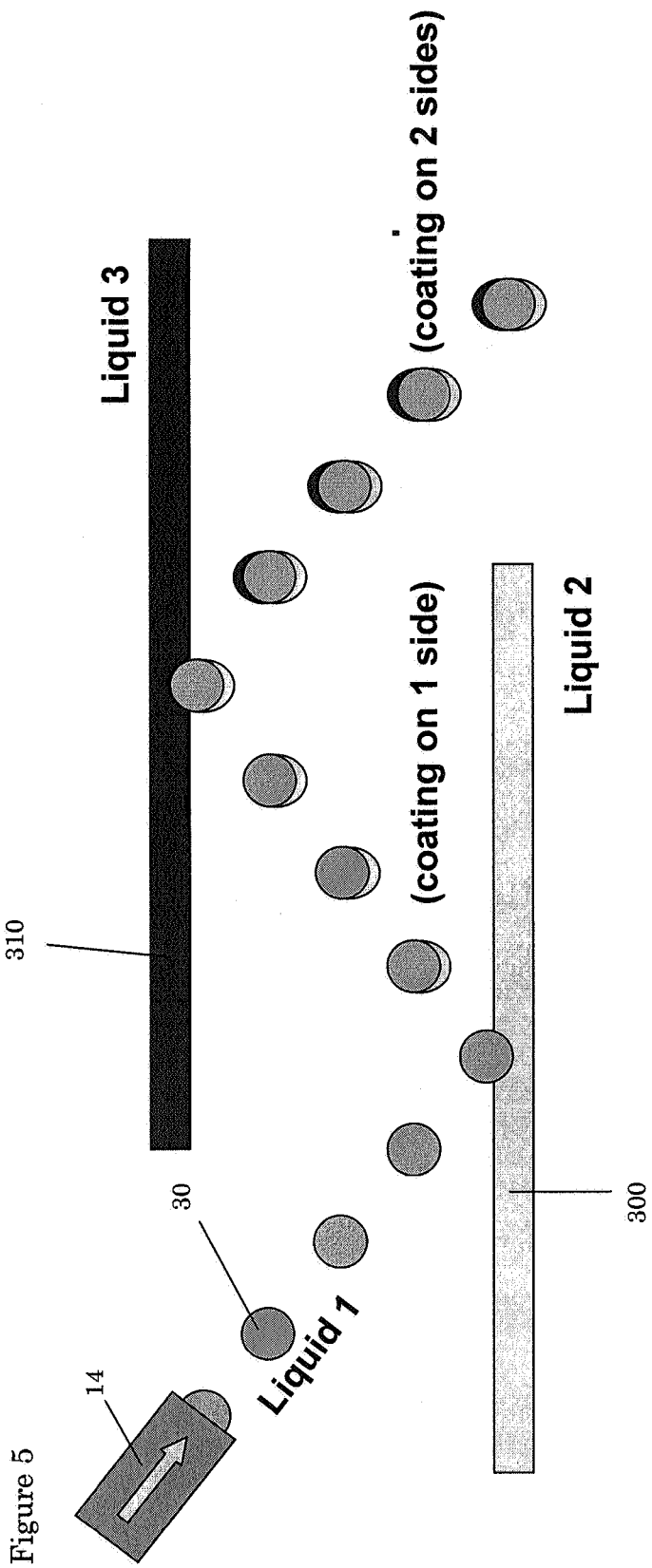
FIG. 5 shows schematically an alternative embodiment of the present invention.

Although it will be illustrated further with reference to FIG. 5, also a reflective collision is possible. The FIG. 1 embodiment illustrates a collision of the droplets 30 with the fluid jet 300 in a transmissive mode, that is that the droplets 30 penetrate the fluid jet 300 from one side to the other side. Further, although FIG. 1 only illustrates a single nozzle system 14 for generating the droplets 30 a plurality of nozzles 14 can be provided to have a plurality of droplet beams collide with the fluid curtain formed by the second nozzle 140.

Figure 2:
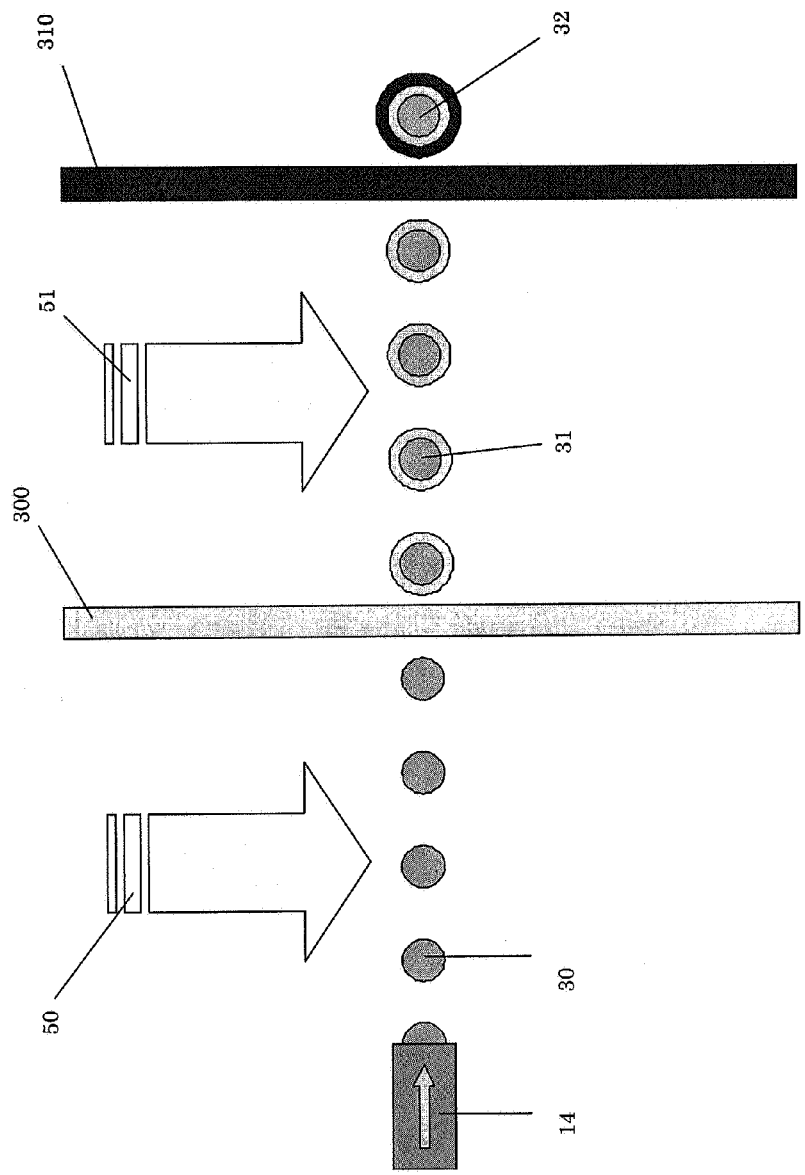
FIG. 2 shows schematically a multi-stage embodiment of continuous droplet generating system according to the invention.

Referring to FIG. 2 a first embodiment is illustrated wherein droplets 30 are produced by nozzle 14 that are generally immiscible with fluid jet 300. In addition a second fluid jet 310 is provided to illustrate the possibility of having colliding a droplet 30 with several fluid jets 300, 310 in order to form multilayer particles 31, 32 or particles comprised of a plurality of components.

In this first embodiment a "true encapsulation" of the droplets 30 with fluid jet material 300 is formed, optionally also by additional fluid jets 310 and higher. Thus, the droplets are formed as a core having an encapsulation formed around the core. Accordingly, complex multilayered/multimaterial particles 32 can be formed according to one aspect of the invention. Since the droplet generating arrangement 14 is of a continuous type this can produce higher volumes and will be interesting for industrial applications. It should be note that the droplets 30 are formed by ejecting a liquid but may become a solid before or after traversing fluid jet 300, for example pending on a preprocess 50 that may be performed on the droplets 30. Such pretreatment can be heating or cooling or drying or gas treatment or a radiation treatment, for example UV-treatment or any technique that may be feasible to pretreat the droplets 30 prior to colliding them with the fluid jet 300. Applications can be for example toner fillings or photography related applications or an application where uniform droplet sizes are of importance for example for providing solder paste. In one embodiment solder balls can be formed by emitting solder droplets and having them coated with the flux provided by a fluid jet. With this process solder balls can be coated with a small amount of flux to generate highly efficient solder paste. Another application can be in food, feed, pharma, cosmetics and other areas where a stabilization or protection of sensitive ingredients is needed. For example by encapsulating these with a permeation-limiting shell material. These ingredients can be protected from degradation by the aforementioned parameters, in order to increase the shell-life of certain products or to enable the use of hitherto unusable ingredients. In this respect the fluid jet material can be chosen to provide a chemically protective encapsulation, or to provide a UV-protective encapsulation. In this respect the protection is designed against an unexpected chemical treat or physical treat of the ingredients, for example but not limited to UV-light, or oxygen, water, PH, ions or chemicals. In addition the encapsulation can be provided to shield reactive ingredients, for example reactive polymers or glues or epoxy resins from environments. In this respect the first material is arranged to be chemically reactive with a for a predetermined environment parameter, for example but not limited to UV-light, oxygen, water, PH, ions or other chemicals. Degradation or rupturing of the encapsulation material may lead to release of the core material which would be able to provide materials that are self-repairing where such particles may be embedded in a matrix material or premixed two-component glue.

The first droplet material may stay in any desired phase depending on material parameters including gas phase, liquid phase or solid phase. For example liquids such as water maybe encapsulated by a solid encapsulation to provide particles filled with water. These might be used to generate instant ready meal without the need of adding extra water. The advantage of having encapsulated is that the water releases when it is necessary and not beforehand.

Another application could be wherein these second materials arranged to be chemically reactive with the predetermined chemical reactant, to provide a triggered release of the first material embedded in the encapsulation. Also the second material can be designed to have suitable material properties to have a predetermined permeability to the first material that is encapsulated inside to provide a time delayed release of the first material. In particular, depending on shell material, particles 31 can be made that can be used as slow or triggered release applications. By selecting a shell material that has a degree of permeability the payload can diffuse out of the particles with a diffusion rate depending on the permeability of the shell.

Alternatively a shell material can be selected that is impermeable until made permeable by a certain trigger (e.g. water, enzymes, pH, temperature, mechanical energy . . . ). This will then result in a release of the payload as described above. In addition, complete and instantaneous release of the payload may also be achieved as a result of a trigger.

Applications for these types of systems can be found in food, feed, and pharma, where release in specific areas in a digestive tract is required; this can be achieved by the action of enzymes present in the various parts of the in a digestive tract.

Another application may be in personal care, where a body cream may contain particles (e.g. perfume, deodorant) that, upon heating, rupture or melt to release an ingredient (e.g. menthol or ethanol), that will produce a cooling or soothing effect.

Other applications may be found in the slow release of fragrances (cosmetics, home care), antibacterial (paint, anti fouling coatings), antioxidants (food, feed).

As shown in FIG. 2 the method can be extended to a collided droplet 31 with a further fluid jet 310. This provides a possibility to encapsulate two or more ingredients that need to be kept apart (e.g. to reactivity). An example may be two component glue: wherein a particle is ruptured, the two components are released and will react. Another example of a multiple layered particle may be a particle that is releasing one or more active ingredients in a time delayed manner. That is each of the ingredients may be released by different or identical triggers which could be used to release various compounds in different parts of a digestive tract and responds to the presence of different enzymes present in the various parts of the digestive tract. Whereas in FIG. 2 a pre-treatment 50 is illustrated, also a post-treatment step 51 can be performed such as heating, cooling, drying or gas treatment or any other UV treatment or other techniques to post process the particles 31. For pre-treatment 50 this may be aimed at providing a droplet that is immiscible with the fluid jet material in order to provide a well defined encapsulation. This may equally apply to the encapsulation of liquefied gasses. According to the invention the method provides a plurality of coated droplets that could be received on a substrate to provide a matrix of droplets having a predetermined interspacing. Here the dimension of the droplets can be very precisely controlled to form identical droplets. To have the particles placed at a fixed distance from each other coloring effect can be generated by interference of light. In particular particles can be distanced optically by having a transparent coating of a predetermined thickness. Placing these particles against each other provides a control distance between core particles. Other application could be providing encapsulated biomaterials such as cells or viruses. Another application could be even providing encapsulated solid objects such as plant seeds to have them coated with predetermined coating materials for example to provide antifungal or germination enhancing effects.

Figure 3:
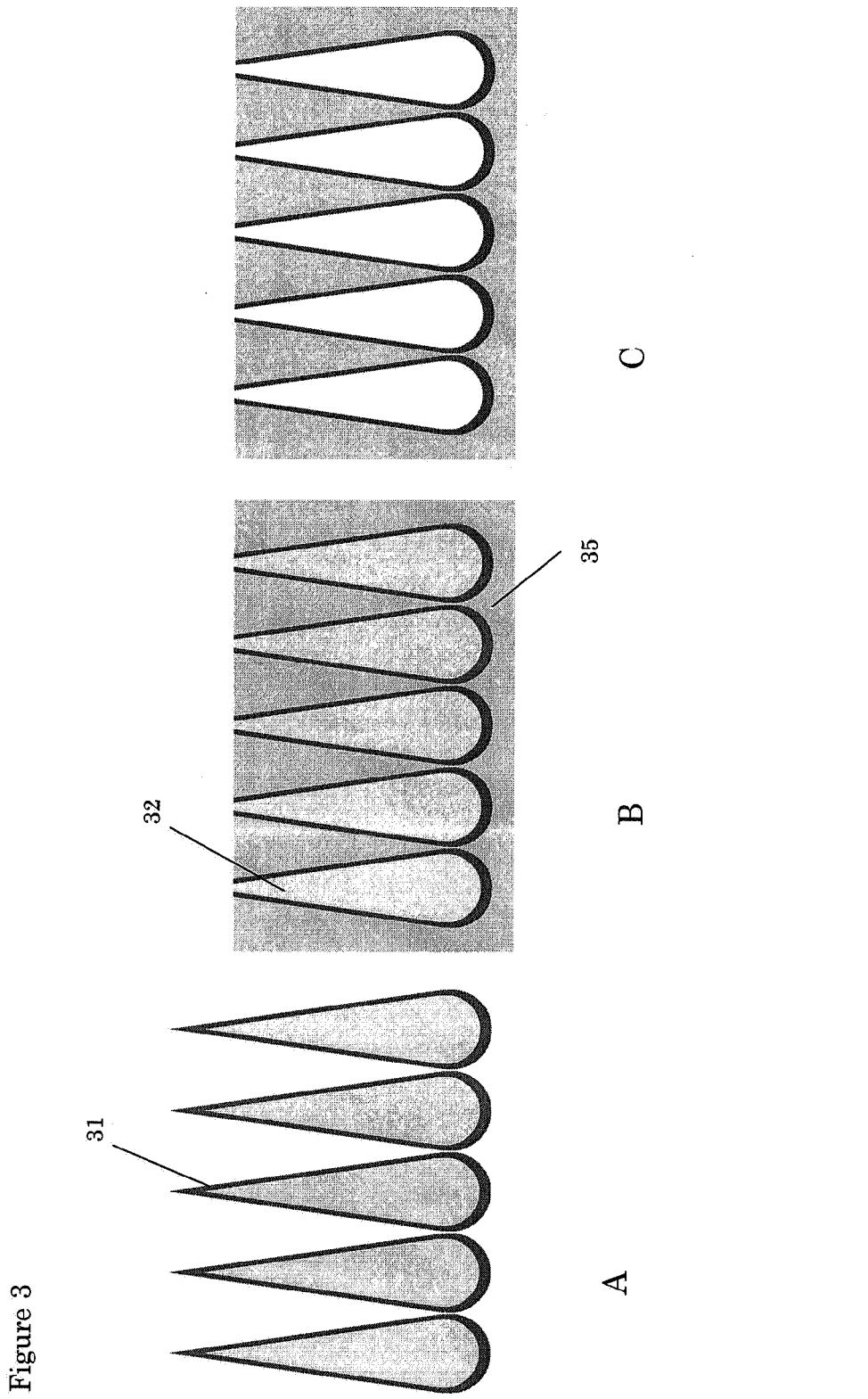
FIG. 3 shows schematically an alternative droplet form application.

FIG. 3 shows a series of non-spherical droplets that can be provided by varying heat capacities and temperatures of the core material 30 and the fluid jet material 300. For example, non-spherical particles can be obtained when providing droplets of water/glycol mixture through a molten paraffin or wax screen 300. Rather than spheres, elongated drops with a long tail were obtained as in Figure A.

Such morphologies can be of interest since the non-symmetrical aspect ratio can provide oriented or aligned particles 32 as in FIG. 3. By removing the tails of these particles 32, optionally by first embedding the particles 32 in a matrix material 35, see Figure B, the inner material can be made addressable, which may provide applications such as a controlled diffusion or release profile of the inner material out of the particles. In addition, as shown in Figure C removal of the interior material may provide interesting large areas structures, for example for use as catalysts or the like.

Figure 4:
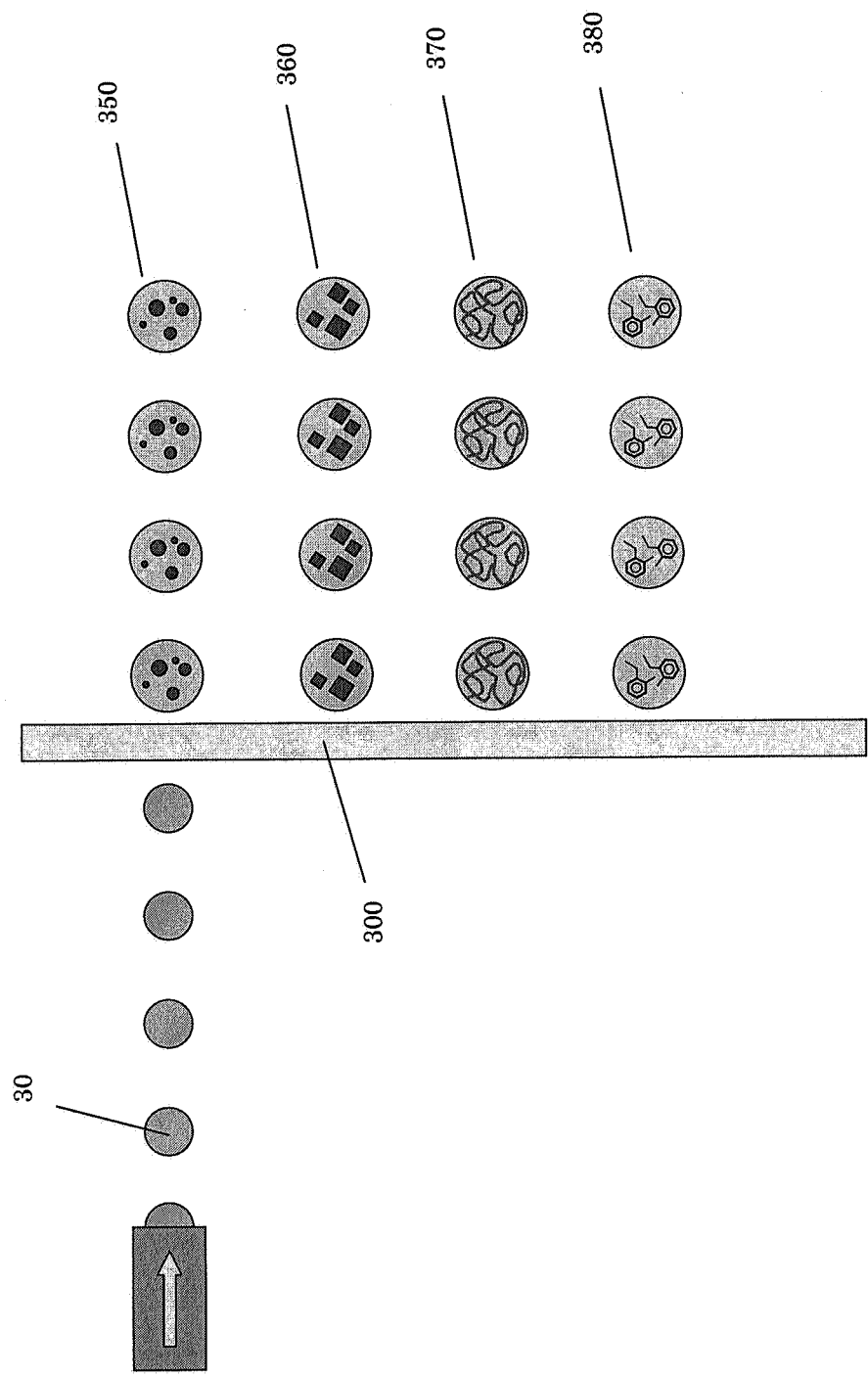
FIG. 4 shows some application examples of the method according to the invention.

FIG. 4 shows a further aspect of the invention, wherein the droplet material 30 and the liquid jet material 300 are chosen to be of a miscible nature, to provide a mixed multicomponent droplet. In contrast to the encapsulated droplet, here the material 30 and 300 are mixed, which could result in emulsified, crystallized or gelated droplets, depending on the materials and conditions chosen, for example this set-up can provide micro-compartmentalized entities or microreactors, which can form a free environments wherein reactions or processes can be employed that are difficult to control in other set-ups due to strong heat effects and for risks of explosion.

It should be noted that the materials 30 and 300 may be a pure liquid or any other suitable forms of fluids that may already be mixed or emulsified or any other condition.

In a first embodiment 350, if droplets 30 comprise of e.g. an oil in ethanol then shooting drops 30 through a screen 300 (e.g. water) will result in a mixing of the ethanol and the water and a demixing of the ethanol and oil, ultimately giving an emulsion of oil in an ethanol/water mixture. (Note: also other solvents and mixtures are possible)

The advantage of such a setup might lie in the fact that the emulsion might be very homogeneous, in that the oil droplets within all of the ethanol/water drops might have very similar sizes. To keep the oil droplets within a single drop separated, a stabilizer (surfactant) may be required.

If the demixing process described above results in the formation of a single oil droplet within each ethanol/water drop then the size of this droplet will be smaller than the original ethanol/oil droplet that was printed. Inherent to the system, each ethanol/water droplet will contain an identical oil droplet. This means that this method can be used to make uniform oil droplets (or other particles) of a size that is not limited by the (lowest possible) size of the printer nozzle.

Applications may be found in pharma where emulsions are frequently used. The potentially small particle size would result in a large surface area per weight, and hence a faster dissolution or better uptake in vivo, potentially leading to higher bioavailability (administration: dermal, pulmonal, mucosal, oral).

The same holds true for food, feed, and cosmetic applications. In addition, smaller emulsions are of interest for pharma, food, and cosmetics as the sensory perception of such small emulsions may be more desirable.

Other applications of these types of emulsions may be found in the paint industry where emulsions are frequently used.

Solidification of the small (inner) droplets might result in interesting nanomaterials, or particles that may have applications in heterogeneous catalysis.

In a second embodiment 360, similar to the previous system, droplets 30 may comprise a solid compound (non-water-soluble) dissolved in ethanol. Printing drops of this solution through screen 300 (e.g. water) would then result in precipitation or crystallization of the solid compound. Analogously to the emulsion system, the size of the solid particles might well be very small, allowing the formation of nanoparticles or nanocrystals. In addition the particle size might be very monodisperse. (Note: crystallization may also be induced by a change in pH, salt concentration or some other parameter.)

Small particles have large surface area per weight and therefore are interesting for applications in pharma, food, feed, and cosmetics as explained for the emulsion system (i.e. bioavailability). Also the sensory perception argument holds true.

Again this system may be interesting for the production of catalyst particles or (nano)particles with nanomaterial applications.

In a third embodiment 370 rather than leading to emulsification or precipitation, the mixing of solution 1 and 2 may result in gelation of the particle. An example of this may be to print drop of a Na-alginate solution through a Ca2+ solution screen, thus producing microgel-particles. Microgel particles are being investigated widely for various applications ranging from drug delivery devices to environmental applications in which they may be used as nanosponges.

In addition, the use of a printing setup allows one to start with a relatively viscous solution (i.e. a concentrated polymer solution), resulting in gel particles with a very high solid content not easily attainable by other methods.

As gels generally consist of two separate but each continuous phases, the removal of one of the two phases would result in a micro/macroporous material of well defined size (monodisperse) that would have zeolite-like properties.

In a fourth embodiment 380, the mixing of several reactants by coalescence of droplets 31 and fluid jet 300 can be used to carry out chemical reactions. Each drop would function as a microreactor, giving many of the advantages for which microfluidic devices are currently being investigated. Heat effects and dangerous compounds would be easier to control, however, the continuous process would still allow the production of significant quantities of material.

It should be noted that the mixing embodiments 350, 360, 370 and 380 can be used in addition to the encapsulation embodiment discussed in FIG. 2. With reference to FIG. 5, the nozzle 14 illustrated in FIG. 4 can be arranged to have the isolated droplets 30 collide with the fluid jet 300 in a reflective mode. It is possible to have a second fluid jet 310 parallel to first fluid jet to provide an additional reflective mode. In this way the isolated droplet 30 can be collided with one or more fluid jets to provide a non-symmetrical coating. For example a rapidly solidifying material may be used for providing droplets 30, resulting in bouncing of solid particles 30 of the surface of fluid jet 300. This may also be a material that solidifies rapidly or which may be a paint that is dried subsequently. It will be appreciated that in the transmissive mode, generally, as shown in FIG. 3, the particles will be provided with a substantially complete encapsulation or complete intermixing, depending on the material, with fluid of the fluid jet 300. In contrast, in the reflective mode, such encapsulation or mixing may be only partial. Accordingly the coating can be non-symmetric with respect to color, polarity, hydrophilic and/or surface chemistry characteristics resulting in different binding or reaction sites. One exemplary use can be as E-ink wherein particles are coated white and black on respective sides and can be addressed to show either white or black when in addition they are having a suitable polarity that can be oriented, for example by electrodes in a conventional way. This can result in higher resolution images since the particle size can be smaller than 250 micron. Also a plurality of colors, for example three different colored sides may be possible. Another application may be used of these asymmetric coated particles as macrosurfactants, for example for novel types of emulsion stabilizers or as compatibilizers for gluing of two different materials. In particular, as particles can be made with different properties on each end, they may be applicable for us as material for coatings, and could for example convert hydrophobic surfaces to hydrophilic.

In addition, they may be used as additives for self-stratifying layers. When for example embedded in apolar matrix, the polar part of the particles will make them diffuse to the surface.

When applied in such coatings the shape of the particles and their organization in the layer can result in optical effects or a lotus effect.

FIG. 6 shows an additional embodiment, demonstrating a method of accelerating a particle 30 toward the fluid jet 300, preferably, to velocities, wherein the particles are able to penetrate and fully traverse the fluid jet, the velocities depending on the thickness of the fluid jet, the fluid jet speed and the particle speeds and masses. Typically, while printing methods may be well capable of imparting sufficient kinetic energy to the particles 30, the particles are generated, for printing nozzles, in a fluid form, which, during flight, may change from liquid phase to another phase, for instance solid phase. The embodiment of FIG. 6 is convenient to accelerate isolated particles that may already be in solid phase, or to impart extra kinetic energy to jetted droplets jetted from printing head 12 and particle interdistance. It can also be used to increasing its focusing accuracy. This embodiment includes a gas stream guiding system 60 which comprises a first part 64 having a forced air intake, and a second part 63 having with a converging diameter over essentially its entire length. Although in the example, single isolated droplets 30 are generated, this embodiment is also suitable for multiple particles released in parallel. Conveniently, this embodiment focuses the particles 30 to a single focused stream of particles.

Suitably the tube diameter of the second part 63 at the start of the converging flow is 8-12 times larger than the tube diameter at the end of the converging flow, i.e. at the release opening 65 of the tube. To establish this, the diameter of the second part 63 converges over the length of said part in respect of the central axis of said second part in an angle in the range of from 2-90°. More preferably, between 5° and 90°, most preferably between 5-45°.

Suitably, part 63 has a length in the range of from 0.5-150 cm. Preferably, the second part 63 has a length in the range of from 0.5-100 cm.

Accordingly, converging part 63 focus and accelerate the carrier gas flow containing particles 30. Suitably, the carrier gas can be normal air but can also be selected from the group consisting of nitrogen, hydrogen, argon or a mixture thereof.

A characterization of the gas flow is through the Stokes number. It will be appreciated that the Stokes number (St) of a particle in a gas flow, in our case droplets, is defined as follows:

$$St = \frac{\rho_p D_p^2 C_c U_o}{18\mu_f L_c}$$

wherein $\rho_p$ is the particle density; $D_p$ the particle diameter; $C_c$ the correction factor (=1); $U_o$ is the characteristic velocity; $\mu_f$ is the fluid viscosity; and $L_c$ is the typical length scale.

To prevent disturbances of the fluid jet 300, a carrier gas deflector system 62 is arranged to deflect the gas flow before collision with the fluid jet 300, so as to have said particle collided with the fluid jet 300 substantially free from the gas flow. Typically, the gas deflector system is formed by a flow channel deflecting the gas stream away from a particle collision direction. At the end of the converging first part 63, the gas stream guiding system comprises a first release opening 65 for releasing the gas into the gas deflector system 62.

Accordingly, in this embodiment, in converging part 63 a steady gas flow is maintained over a first period of time, wherein the Stokes number of the droplets in the gas stream is less than 1 during the first period of time. Which will make the particles follow the gas flow and they will accelerate substantially equal with the gas acceleration. Subsequently, the steady flow of the droplets in the gas stream is converted into a converging flow and maintaining the converging flow of the droplets over a second period of time, whereby the Stokes number of the droplets in the gas stream increases up to a value higher than 10 during the second period of time, near the end of part 63 leading to part 65. Typically, the first and second periods of times may be in the range of from 0.1-10 seconds and 0.01-1 seconds respectively. In the second period, the particles will not be further accelerated but will follow their own course, towards second release opening 66.

In this embodiment, the deflector is formed by a flow channel deflecting the gas stream away from a particle collision direction and wherein, in the flow channel, along a particle collision direction and opposite the first release opening 75; a second release opening 66 is provided for providing passage to the particle 30. Due to the high Stokes number the kinetic energy of the particles will be dominant and they will follow their own trajectory through opening 66. Typically, to direct the volumetric gas flows away from the second release opening 66, the first release opening 65 is larger than the second release opening 66. Pumps 61 may be provided in a counter flow path between the second part and the first part, to maintain the carrier gas stream in almost a closed system, (re)injecting the gas into the first part 64, after flowing from the second part 63.

In the above illustrated examples a method has been demonstrated for generating a multicomponent particle comprising generated at least one isolated particle 30 of a first material, generating a generally uninterrupted fluid jet of a fluid jet 300 of a second material and colliding said isolated droplet 30 with the fluid jet 300 so as to combine said droplet of the first material with the second material. In this respect it is noted that the term "generally uninterrupted" refers to a fluid jet, without dividing up into separate droplets by Rayleigh break up effect or by any other disturbance such as mixing or combining of flows when collided, except, of course the collision of the particle itself. However, more downstream of the jet such could be taking place without consequences for the particle encapsulation. By providing curtain form liquid of a generally planar shape a generally large impact area can be provided so that a plurality of particle beams can be aimed at the fluid jet and large quantities of particles can be produced. The planarity of the fluid jet can be increased by having a cross-section of the fluid jet nozzle 140 in a slip form having broadened opposite sides. Further, applied pressures can range from 0.1-3000 bars and applied temperatures can range from −200 to +1800° C. Viscosities may range from $0.5\ 10^{-3}$ to $3000\ 10^{-3}$ Pa·s upon exit. In addition, the term "fluid" may encompass, without limitation, a liquid or liquid mixtures; solutions; emulsions; dispersions or melts, and may include gasses or liquefied gasses. Furthermore, although the invention has been described with fluid particles as embodiments, other types of particles may be applied likewise, such as solid grains or seeds etc. The invention has been described on the basis of an exemplary embodiment, but is not in any way limited to this embodiment. Diverse variations also falling within the scope of the invention are possible.

The invention claimed is:

1. A multicomponent particle generating system comprising:

a first nozzle constructed to generate at least one isolated particle;

a second nozzle arranged to generate an uninterrupted fluid jet without breaking up into separate droplets;

said first and second nozzles arranged to have said isolated particle collide with the fluid jet so as to combine said isolated particle with fluid of the second nozzle fluid jet, for providing a multicomponent particle; and a collector by which said multicomponent-particle is captured in isolated form after collision with the fluid jet.

2. A multicomponent particle generating system according to claim 1, wherein said first nozzle is arranged to have said isolated particle collide with the fluid jet in a transmissive mode, wherein, prior to collection, the first and second nozzles are arranged to have the isolated particle traverse the fluid jet from one side to the other side and wherein the collector collects the multicomponent particle on said other side.

3. A multicomponent particle generating system according to claim 1, wherein said first nozzle is arranged to have said isolated particle collide with the fluid jet in a reflective mode so as to bounce said isolated particle on the surface of the fluid jet.

4. A multicomponent particle generating system according to claim 1, wherein said second nozzle is slitted to produce a sheet form uninterrupted fluid jet.

5. A multicomponent particle generating system according to claim 4, wherein said second nozzle is formed with a cross-section having broadened opposite sides.

6. A multicomponent particle generating system according to claim 1, wherein said first nozzle is arranged to provide isolated particles in a continuous manner.

7. A multicomponent particle generating system according to claim 1 further comprising a first pressure system having a plurality of first nozzles arranged to have a plurality of isolated particles collide with the fluid jet of the second nozzle.

8. A multicomponent particle generating system according to claim 1, further comprising a carrier gas stream guiding system having a converging diameter over its entire length, and a carrier gas deflector system arranged to deflect a gas flow before collision with the fluid jet, so as to have said isolated particle collide with the fluid jet free from the gas flow.

9. A multicomponent particle generating system according to claim 8, wherein the gas stream guiding system comprises a first release opening for releasing the gas flow into the gas deflector system; the deflector formed by a flow channel deflecting the gas stream away from a particle collision direction and wherein, in the flow channel, along a particle collision direction; a second release opening is provided for providing passage to the particle.

10. A multicomponent particle generating system according to claim 9, wherein the first release opening is larger than the second release opening.

* * * * *